(12) United States Patent
Bai (10) Patent No.: US 7,532,783 B2
(45) Date of Patent: May 12, 2009

(54) METHOD AND SYSTEM FOR INTEGRATED DWDM RECEIVERS

(75) Inventor: Yu Sheng Bai, Los Altos Hills, CA (US)

(73) Assignee: FutureWei Technologies, Inc., Plano, TX (US)

( * ) Notice: Subject to any disclaimer, the term of this patent is extended or adjusted under 35 U.S.C. 154(b) by 5 days.

(21) Appl. No.: 11/829,295

(22) Filed: Jul. 27, 2007

(65) Prior Publication Data

US 2008/0089688 A1    Apr. 17, 2008

Related U.S. Application Data

(60) Provisional application No. 60/829,009, filed on Oct. 11, 2006.

(51) Int. Cl.
*G02B 6/12*    (2006.01)

(52) U.S. Cl. .......................................... 385/14

(58) Field of Classification Search ........................ None
See application file for complete search history.

(56) References Cited

U.S. PATENT DOCUMENTS

| | | | |
|---|---|---|---|
| 5,617,234 A * | 4/1997 | Koga et al. ................ | 398/14 |
| 6,108,472 A | 8/2000 | Rickman et al. | |
| 7,050,666 B2 | 5/2006 | Welch et al. | |
| 2004/0131302 A1* | 7/2004 | Kouta et al. ................ | 385/14 |

OTHER PUBLICATIONS

Henry et al., "Glass Waveguides on Silicon for Hybrid Optical Packaging," Journal of Lightwave Technology, vol. 7, No. 10, pp. 1530-1539 (Oct. 1989).

Kwong et al., "Novel Single Mode Laser Fabrication Using Focus Ion Beam (FIB) Etching," Optical Fiber Communication Conference, 2006 and the 2006 National Fiber Optic Engineers Conference 2006, Mar. 5-10, 2006 3 pp. http://.nkwong@archcomtech.com.

Li, et al. "Hybrid Integration." in: Optical fiber telecommunications IIIB (edited by) Kaminow and Koch, (Lucent Technologies 1997) pp. 367-368 TK5103.59H3516.

Yoshikuni, Yuzo, "Semiconductor Arrayed Waveguide Gratings for Photonic Integrated Devices," IEEE Journal of Selected Topics In Quantum Electronics, vol. 8, No. 6, Nov./Dec. 2002.

Zirngibl, et al., "WDM receiver by monolithic integration of an optical preamplifier, waveguide grating router and photodiode array," Electronics Letters, vol. 31, No. 7, p. 581 (Mar. 30, 1995).

* cited by examiner

*Primary Examiner*—Sung H Pak
(74) *Attorney, Agent, or Firm*—Townsend and Townsend and Crew LLP (57) ABSTRACT

An integrated DWDM receiver apparatus includes a support component and a silica-on-silicon substrate overlying the support component. The substrate includes a silica layer overlying a silicon layer and includes a first surface region and a second surface region. An optical demultiplexer is disposed within the silica layer under the first surface region and overlying the silicon layer. The optical demultiplexer includes a plurality of output waveguides and at least an input waveguide. The receiver apparatus includes one or more reflecting structures located in the silica layer under the second surface region. Each of the reflecting structures is optically coupled to a corresponding output waveguide. The receiver apparatus also includes one or more semiconductor photodetector array chips overlying the second surface region of the silica-on-silicon substrate. Each of the one or more photodetector array chips including one or more photodetectors which is optically coupled to a corresponding reflecting structure.

22 Claims, 4 Drawing Sheets

METHOD AND SYSTEM FOR INTEGRATED DWDM RECEIVERS

CROSS-REFERENCES TO RELATED APPLICATIONS

This application claims priority to U.S. Provisional Patent Application No. 60/829,009, filed Oct. 11, 2006, commonly assigned, incorporated by reference herein for all purposes. Additionally, this application is related to U.S. patent application Ser. No. 11/696,472, filed Apr. 4, 2007, commonly assigned, incorporated by reference herein for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to fiber optical transport systems. More particularly, the invention provides a method and system for an integrated optical receiver for reducing the size and cost of optical transport systems. Merely by way of example, the invention has been applied to dense wavelength division multiplexing (DWDM) optical transport systems employing InP photodetectors. But it would be recognized that the invention has a much broader range of applicability.

Since its first deployment in the middle of 1990s, dense wavelength division multiplexing (DWDM) has become a dominant technology for long haul and regional backbone transport networks, and is gradually making its way to metro area networks. An optical transport system usually includes one or more linecards. A linecard is often built around one or several optical components. For example, the received DWDM optical signal from the transmission fiber is first passed through a demultiplexer linecard, which includes DMUX filters. A commonly used DMUX filter is based on arrayed waveguide grating (AWG) made of silica-on-silicon. The optical outputs from the demultiplexer linecard, each at a wavelength by the ITU-T standards, are then fed into the receiver linecards. The optical connections between the linecards are generally made through optical fibers. A receiver card typically includes a photodetector, for example, a p-i-n (PIN) photodiode, or an avalanche photodiode (APD), that converts the input optical into an electrical signal for further processing. The photodetector chips inside the photodetector packages are typically made of InP semiconductor compounds.

Even though these conventional DWDM systems are useful in some areas, they have many limitations that restrict their effectiveness in broader applications. Some of these limitations are discussed below, and then improved techniques based on embodiments of the present invention are presented.

BRIEF SUMMARY OF THE INVENTION

The present invention is directed to fiber optical transport systems. More particularly, the invention provides a method and system for an integrated optical receiver for reducing the size and cost of optical transport systems. Merely by way of example, the invention has been applied to DWDM optical transport systems employing InP photodetectors. But it would be recognized that the invention has a much broader range of applicability.

A specific embodiment of the present invention provides an integrated dense wavelength division multiplexing (DWDM) receiver apparatus that converts a multiple-channel DWDM signal to multiple electrical signals. The apparatus includes, among other things, a support component and a silica-on-silicon substrate overlying the support component. The silica-on-silicon substrate includes a silica layer overlying a silicon layer. The silica-on-silicon substrate also includes a first surface region and a second surface region. The receiver apparatus includes an optical demultiplexer within the silica layer. The optical demultiplexer is located under the first surface region and overlies the silicon layer. The optical demultiplexer includes at least an input waveguide for receiving the multiple-channel DWDM signal and a plurality of output waveguides for transmitting one or more demultiplexed optical signals. The receiver apparatus also includes one or more reflecting structures located in the silica layer underlying the second surface region. Each of the reflecting structures is optically coupled to a corresponding one of the plurality of output waveguides. The receiver apparatus further includes one or more semiconductor photodetector array chips overlying the second surface region of the silica-on-silicon substrate. Each of the one or more photodetector array chips includes one or more photodetectors for converting an optical signals to a correspond electrical signal. Each of the photodetectors overlies a corresponding one of the reflecting structures and is optically coupled to the reflecting structure. In an embodiment, the receiver apparatus also includes one or more output terminals to output the converted electrical signals by the photodetectors.

In another embodiment, the invention provides an integrated dense wavelength division multiplexing (DWDM) receiver apparatus, which includes, among other things a support component and a silica-on-silicon substrate overlying the support component. The silica-on-silicon substrate includes a silica layer and a silicon layer. The silica-on-silicon substrate also includes a first surface region and a second surface region. In a specific embodiment, the receiver apparatus includes an arrayed waveguide grating within the silica layer. The arrayed waveguide grating is located under the first surface region and overlies the silicon layer. The arrayed waveguide grating includes a plurality of output waveguides and at least an input waveguide. The receiver apparatus also includes one or more reflecting structures located in the silica layer underlying the second surface region. Each of the reflecting structures is optically coupled to a corresponding one of the output waveguides. The receiver apparatus also includes one or more InP photodetector array chips overlying the second surface region of the silica-on-silicon substrate. Each of the photodetector array chips includes one or more InP photodetectors, and each of the one or more InP photodetectors is optically coupled to a corresponding one of the reflecting structures.

In yet another embodiment, the invention provides a method for making an integrated DWDM receiver apparatus. The method includes providing a silicon layer and forming an optical demultiplexer within a silica layer, which is located on the silicon layer. The optical demultiplexer includes a plurality of output waveguides and at least an input waveguide. The method includes forming one or more reflecting structures in the silica layer. Each of the reflecting structures is optically coupled to a corresponding one of output waveguides. The method includes mounting one or more semiconductor photodetector array chips on the silica layer. Each of the one or more semiconductor photodetector array chips includes one or more photodetectors, and each of the photodetectors overlies a corresponding one of the reflecting structures. The method also includes attaching the silicon layer to a support component, which may include a temperature adjustment component. In specific embodiment, the optical demultiplexer is formed using the following processes:

forming a first un-doped silica sub-layer on the silicon layer;
forming a doped silica sub-layer on the first un-doped silica sub-layer;
etching at least a second portion of the doped silica sub-layer;
depositing a second un-doped silica sub-layer on the etched doped silica sub-layer and the first un-doped silica sub-layer.

In a specific embodiment of the method, each of the semiconductor photodetector array chips includes one or more photodetector diodes made in InP. In an embodiment, the optical demultiplexer includes an arrayed waveguide grating. In a specific embodiment, the process of forming of the reflecting structures includes forming a recess region in a first region of the silica layer. The recess region includes a first surface and a second surface. The first surface terminates a corresponding one of the output waveguides, and the second surface is spaced apart from the output waveguide and disposed at approximately 45° angle with respect to the output waveguide. The second surface is then coated using a metal layer. In another embodiment, a reflecting structure is made by making an approximately 45° cut to an output waveguide to form a terminating surface of the waveguide for enabling total internal reflection. In an embodiment, the semiconductor photodetector array chips are mounted using a surface mount method. In a specific embodiment, a metal solder is used in the surface mounting process.

Many benefits are achieved by way of the present invention over conventional techniques, such as a monolithically integrated DWDM receiver on an InP substrate. For example, in certain embodiments, an embodiment of the invention provides a method and system for integrating semiconductor InP photodetector chips with a silica/silicon AWG substrate for reducing the size and cost of the terminals of optical transport systems. Because the processing cost per unit area for silica-on-silicon can be two orders of magnitude lower than that for InP, the AWG according to embodiments of the present invention can be made at much lower cost. Silica-on-silicon AWGs is a much more mature technology. For example, transmission loss is much smaller in AWGs made of silica-on-silicon than those made of InP. Because there are much fewer elements on the InP chip according to embodiments of the invention, compared to the conventional InP monolithic integration method, the InP chip fabrication yield is much higher. Without AWG, the InP chip is also much smaller, according to an embodiment of the invention. The high yield and the small size significantly reduce the cost of the InP chips used for hybrid integration in accordance to embodiments of the present invention.

According to certain embodiments of the present invention, a method is provided for using surface illuminated APDs which can results in >=10 dB increase in receiving sensitivity than conventional techniques. This improvement can enable long distance transmission without optical amplifiers. Further, in term of finished device, the size of a hybrid integrated DWDM receiver according to specific embodiments of the invention is comparable to that of a monolithically integrated DWDM receiver. Thus the small size advantage of an integrated DWDM receiver is retained according to certain embodiments of the present invention.

Various additional objects, features, and advantages of the present invention can be more fully appreciated with reference to the detailed description and accompanying drawings that follows.

DETAILED DESCRIPTION OF THE INVENTION

The present invention is directed to fiber optical transport systems. More particularly, the invention provides a method and system for an integrated optical receiver for reducing the size and cost of optical transport systems. Merely by way of example, the invention has been applied to DWDM optical transport systems employing InP photodetectors. But it would be recognized that the invention has a much broader range of applicability.

The optical components in a conventional DWDM system are usually individually packaged. To a great extent, the packaging cost determines the price of the components. For example, the cost of a high speed (>~10 Gbps) bare PIN chip cost only a few dollars, while a packaged PIN sells for several hundred dollars, mostly due to the cost of packaging. It is thus difficult to further reduce the cost with the conventional DWDM system design. In addition, the multiple linecards, each built with the individual components, make it difficult to reduce the size of the DWDM terminals.

In the last several years, there have been efforts to monolithically integrate multiple photodetectors and the AWG onto a single InP chip. In this way, the size of a DWDM terminal can be significantly reduced. Monolithic integration methods rely heavily on InP chip processing technologies, which have yet to reach maturity. The yield of InP processing is low compared to silicon processing, even for single element chips. With multiple elements integrated on a single chip, the yield tends to decrease exponentially. In addition, the AWG, which is a passive element, usually occupies much larger area of the integrated chip than the active elements, such as photodetectors. This results in an inefficient use of the expensive InP materials.

As a general rule of thumb, the size of InP wafers is an order of magnitude smaller than silicon wafers. For example, the diameters of InP wafers are typically 2" or 3", as compared to 8" or even 12" for silicon wafer. The processing cost per unit area for InP wafers can be two orders of magnitude higher than that for silicon wafers. The low chip yield, coupled with high processing cost, makes it uneconomical to monolithically integrate a DWDM receiver. In addition, the InP AWGs tend to have large on-chip insertion loss. The loss also tends to be dependent on the polarization of the input optical signal, which causes signal amplitude fluctuation in practical systems. The spatial mode mismatch between the input optical fiber and the InP receiver waveguide also introduces additional loss. Thus the performance of the monolithically integrated DWDM receivers is often worse than that of the combination of DMUX/individual receivers used in conventional DWDM systems. From the above, it is seen that an improve technique for DWDM receiver design is desired.

Depending upon the embodiment, the present invention includes various features, which may be used. These features include the following:

1. A hybrid integrated DWDM receiver with one or more multiple photodetector array chips made of InP surface mounted on an arrayed waveguide grating (AWG) made of silica-on-silicon planar lightwave circuit (PLC);
2. A method for the optical output from each AWG output waveguide being reflected 90° by a 45° reflector on the PLC to couple the light to the corresponding surface mounted photodetector; and
3. A method for using surface illuminated APDs which can result in >=~10 dB increase in receiving sensitivity and enable long distance transmission without optical amplifiers.

As shown, the above features may be in one or more of the embodiments. These features are merely examples, which should not unduly limit the scope of the application. One of ordinary skill in the art would recognize many variations, modifications, and alternatives.

Figures 1A, 1B:
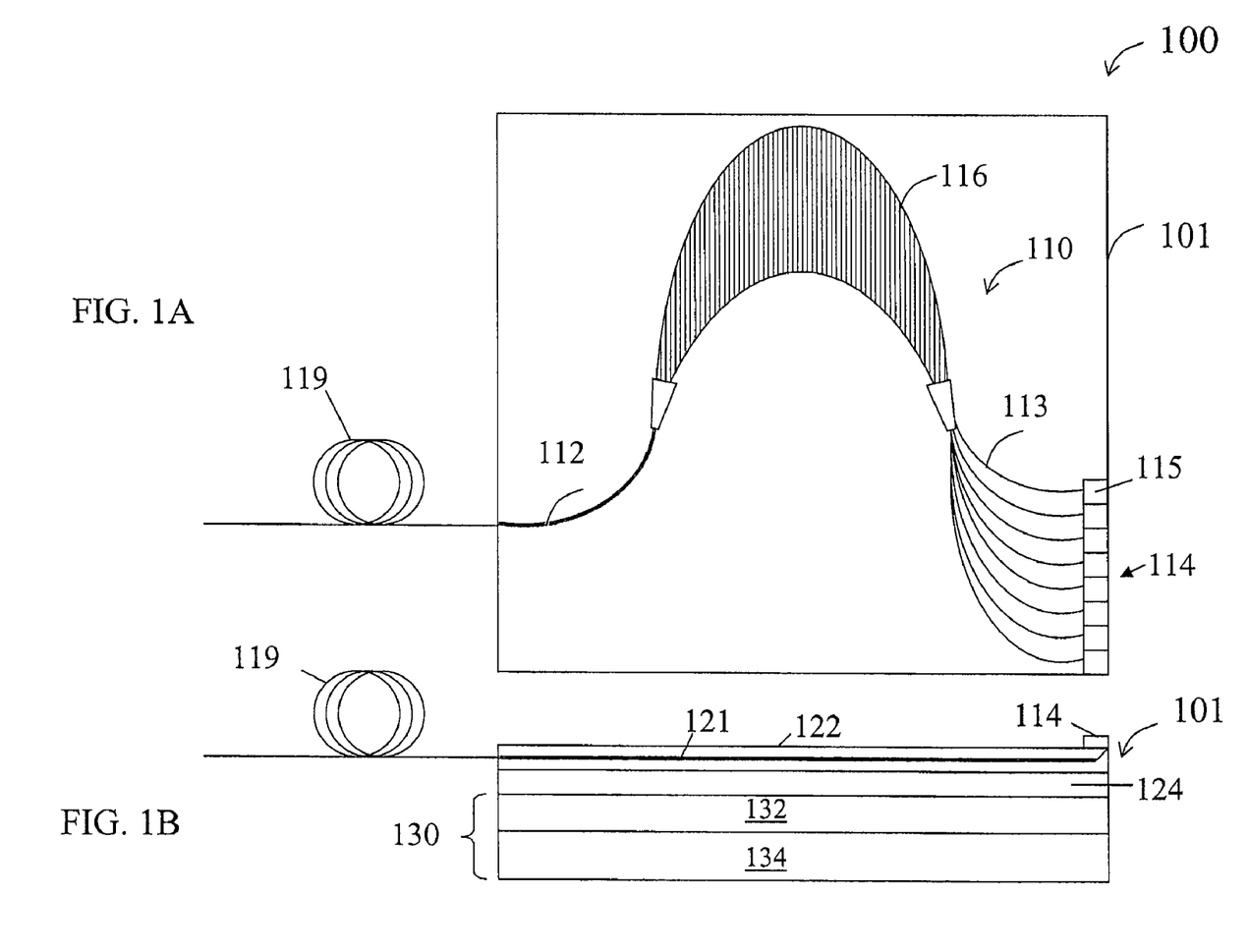
FIG. 1A is a simplified top view diagram of a hybrid integrated DWDM receiver according to an embodiment of the present invention.
FIG. 1B is a simplified cross-sectional view diagram of the hybrid integrated DWDM receiver of FIG. 1A according to the above embodiment of the invention.

FIG. 1A is a simplified top view diagram of a hybrid integrated DWDM receiver according to an embodiment of the present invention. This diagram is merely an example, which should not unduly limit the scope of the claims herein. One of ordinary skill in the art would recognize other variations, modifications, and alternatives. As shown, hybrid integrated DWDM receiver 100 includes a silicon bench 101. In a specific embodiment, the silicon bench 101 includes a silica-on-silicon substrate. Hybrid receiver 100 also includes an optical demultiplexer in the silicon bench. In a specific embodiment, the optical demultiplexer includes an arrayed waveguide grating (AWG) 110 made in a silica-on-silicon planar lightwave circuit (PLC) in the silicon bench. Hybrid receiver 100 further includes one or more multiple photodetector array chips, e.g., 114. In a preferred embodiment, the photodetector array chips include photodetectors made in InP. In a specific embodiment, each InP photodetector array chip includes one or more photodetectors, e.g. 115. Of course, there can be other variations, modifications, and alternatives.

In a specific embodiment, the AWG 110 includes one optical input port 112, multiple output ports 113, and grating waveguides 116. In an embodiment, the input port 112 is optically coupled to an optical fiber 119 for receiving a DWDM optical signal, which may be coupled to an optical transmission system. The output and input ports, for example, can all be implemented in the form of waveguides. In a specific embodiment, the grating waveguides 116 include a number of waveguides for coupling to the input and output ports. These waveguides have varying lengths for performing wavelength division multiplexing and demultiplexing functions. In a specific embodiment, each of the output ports outputs a demultiplexed optical signal. In some embodiments, each output port of the AWG has a center wavelength and pass band associated with light transmission. In a specific embodiment, the center wavelength corresponds to a particular wavelength associated with a frequency defined by ITU-T standards, for example, 193.1 THz.

FIG. 1B is a simplified cross-sectional view diagram of the hybrid integrated DWDM receiver 100 according to an embodiment of the invention. This diagram is merely an example, which should not unduly limit the scope of the claims herein. One of ordinary skill in the art would recognize other variations, modifications, and alternatives. As shown, a waveguide includes doped silica region 121 enclosed in an undoped silica layer 122 on a silicon substrate 124. In a specific embodiment, the doped silica region 121 has a higher dielectric constant than the undoped silicon region. In a specific embodiment, the doped silica region 121 has a higher index of refraction than the undoped silica region. In a specific example, the doped silica region 121 has a index of refraction of about 1.47, and the undoped silica region has a index of refraction of about 1.45. In FIG. 1B, waveguide 121 is used to illustrate a cross sectional view of parts of waveguides in input port 112, grating waveguides 116, and output port 113.

According to embodiments of the present invention, integrated receiver 100 includes one or more photodetector array chips, and each photodetector array chip may include one or more photodetectors. In the specific embodiment shown in FIG. 1A, the integrated receiver 100 includes a photodetector array chip 114. In this specific example, the array chip includes eight photodetectors made in InP. In a specific embodiment, the photodetectors include p-i-n (PIN) photodiodes. In other embodiments, the photodetectors include avalanche photodiodes (APD). The use of surface illuminated APDs can lead to >=10 dB increase in receiving sensitivity, which enables long distance transmission without optical amplifiers. In conventional technologies, APDs have usually been used in individually packaged receivers. An embodiment of the present invention provides a method for an integrated DWDM receiver with APDs. According to some embodiments of the present invention, the photodetector arrays can also be single photodetector chips. A function of photodetectors is to convert each optical signal to a corresponding electrical signal output through an electrical lead (not shown in the drawing). Alternatively, the electrical signal can be amplified by a post amplifier before being sent out. The post amplifiers can either be mounted on the PLC, or on a separate substrate. Of course, one of ordinary skill in the art would recognize other variations, modifications, and alternatives.

As shown in FIG. 1A, according to some embodiments of the present invention, the photodetector array chips are mounted on a portion of the silicon bench 101, in the vicinity of the output ports 113 of the AWG 110. In an embodiment, this mounting is performed using a surface mount process with metal solders, which provide both mechanical strength and electrical connections for the photodetectors. Depending on the embodiment, other bonding methods using suitable adhesives can also be used.

According to a specific embodiment of the invention, the silicon bench is mounted on a support component 130, as shown in FIG. 1B. In a specific embodiment, the support component 130 includes a temperature adjustment component 134 and an optional submount 132. The temperature adjustment component keeps the optical components such as the waveguides, the AWG and the photodetectors at a suitable operating temperature, for example, from 20-50° C. In a specific embodiment, the temperature adjustment component includes a thermal electric cooler (TEC). In an embodiment, at the operating temperature, the center wavelengths of the AWG output ports substantially fall on the ITU-T grids, for example, 193.1 THz, 193.2 THz, 193.3 THz, etc. Typically, the center wavelengths of the AWG can shift with temperature by ~0.01 nm/° C. In some embodiments, the support component 130 also includes a submount 132 on the temperature adjustment component 134. In an embodiment, the submount 132 is made of materials containing metal or ceramics which provide mechanic strength and thermal conductance.

Figure 2A:
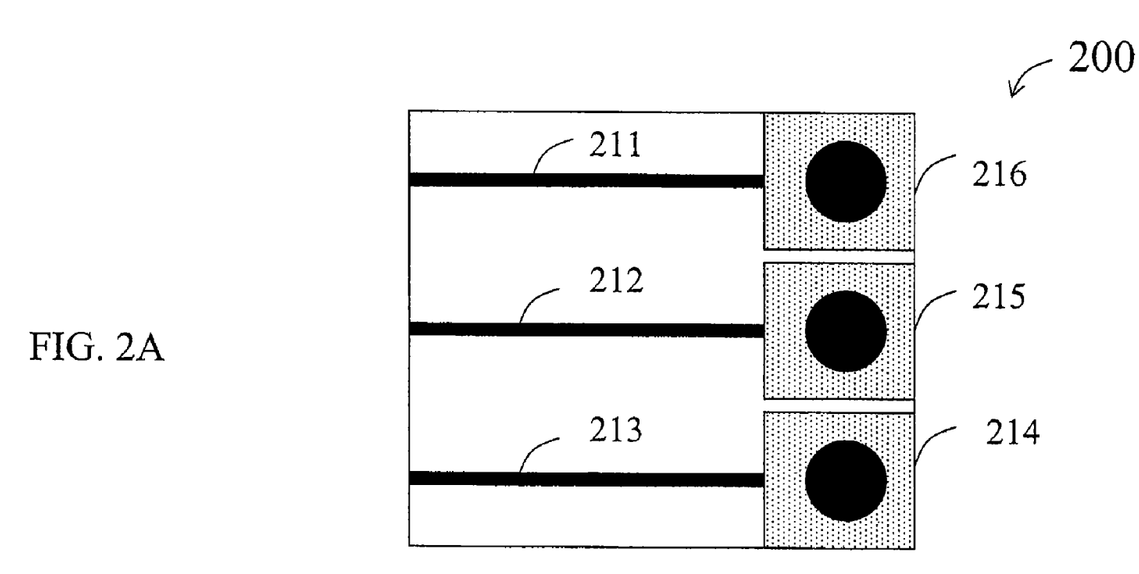
FIG. 2A is a simplified expanded top view diagram of a hybrid integrated DWDM receiver according to another embodiment of the present invention.

FIG. 2A is a simplified expanded top view diagram of a hybrid integrated DWDM receiver according to another embodiment of the present invention. This diagram is merely an example, which should not unduly limit the scope of the claims herein. One of ordinary skill in the art would recognize other variations, modifications, and alternatives. As shown in FIG. 2A, hybrid integrated DWDM receiver 200 includes waveguides 211, 212, and 213 that are coupled to an optical demultiplexer, such as an arrayed waveguide grating (AWG) (not shown). As an example, the waveguides and the AWG are made in silica-on-silicon planar lightwave circuit (PLC), as described in FIG. 1A. Integrated receiver 200 also includes photodetectors 214, 215, and 216. Examples of photodetectors are discussed above in connection with FIGS. 1A and 1B.

Figure 2B:
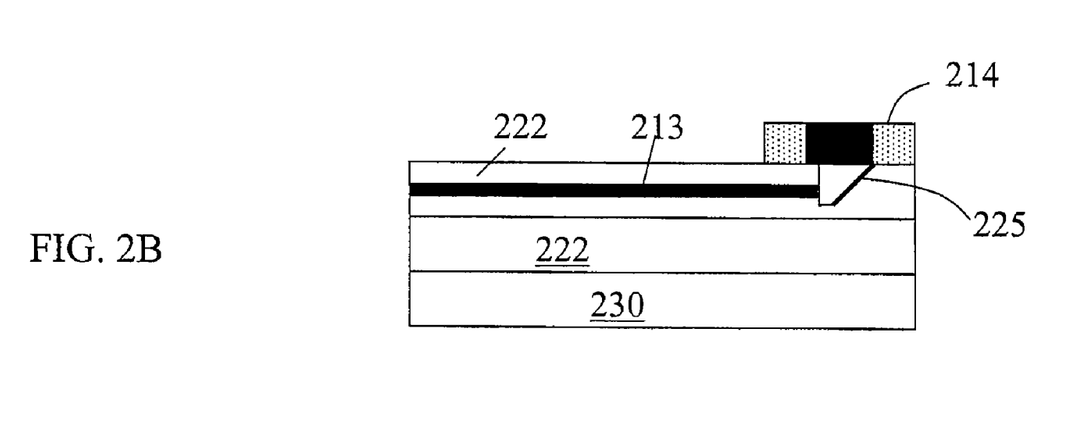
FIG. 2B is a simplified expanded cross-sectional view diagram of the hybrid integrated DWDM receiver of FIG. 2A according to the above embodiment of the invention.

FIG. 2B is a simplified expanded cross-sectional view diagram of the hybrid integrated DWDM receiver 200 according to an embodiment of the invention. This diagram is merely an example, which should not unduly limit the scope of the claims herein. One of ordinary skill in the art would recognize other variations, modifications, and alternatives. As shown, the cross section view of receiver 200 includes silica waveguide 213 enclosed in an undoped silica layer 222 on a silicon substrate 224. In an embodiment, at a terminal of output waveguide 213, a 45° mirror 225 is formed in the silica layer of the PLC. In an embodiment, light coming out of each output waveguide is reflected to the surface of the PLC and collected by a corresponding photodetector, e.g., 214. In an embodiment, the mirror is formed using an etching process to form a recess in the silica layer and a sloped reflecting surface. In other embodiments, other conventional integrated circuit or MEMS processing techniques can be used to form the 45° mirror. In certain embodiments, the mirror surface is coated with a metal having high reflection efficiency, such aluminum. In a specific embodiment of the present invention, the light collection efficiency of this arrangement can be as high as 90%.

In alternative embodiments of the invention, the 90° light reflections can also be produced by total internal reflections from a 45° cut to the PLC across the waveguides. For example, a gap is formed in the silica layer at an end point of an output waveguide with a 45° surface terminating the waveguide to allow total internal reflection. In a specific embodiment, such a cut can be made with a diamond saw or a focused ion beam (FIB) etching. It can be calculated that the critical angle for total internal reflection in silica-air interface is ~42° (assuming index of refraction of silica to be 1.5). Thus, according to an embodiment of the invention with a 45° cut, practically all the light out of the waveguide is reflected towards to the surface of the PLC. Of course, there can be other variations, modifications, and alternatives.

Figure 3A:
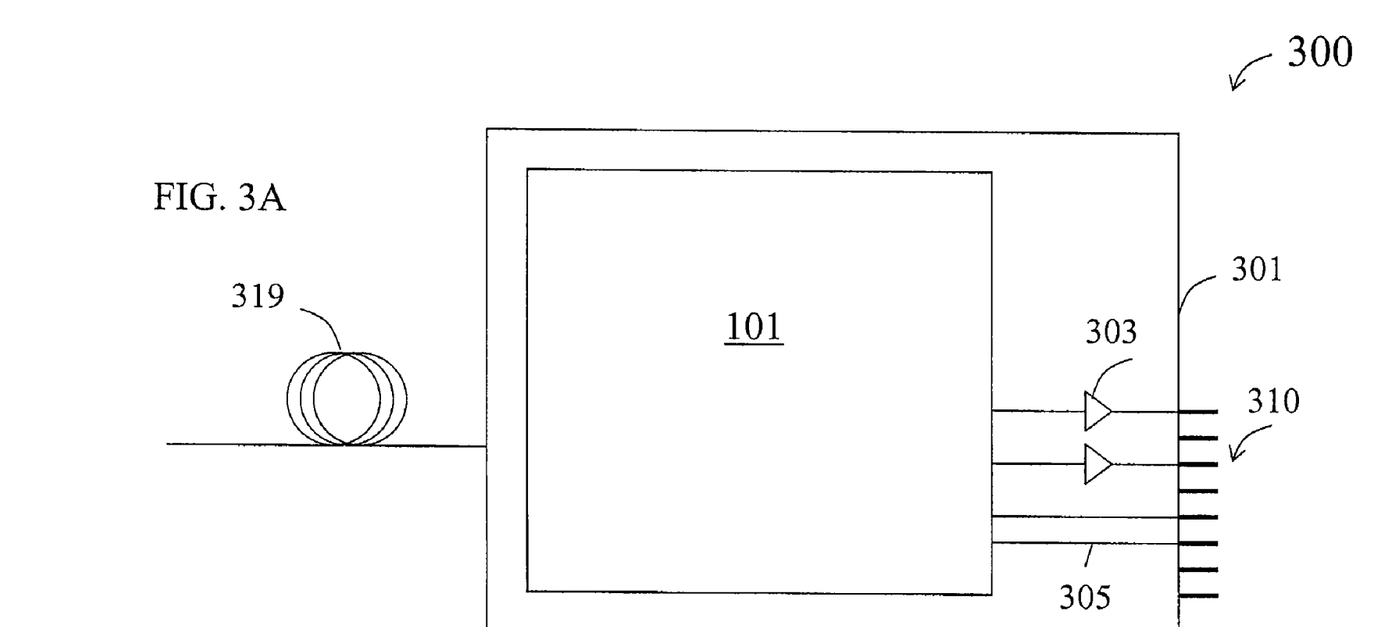
FIG. 3A is a simplified top view diagram of a packaged hybrid integrated DWDM receiver according to an alternative embodiment of the present invention.
Figure 3B:
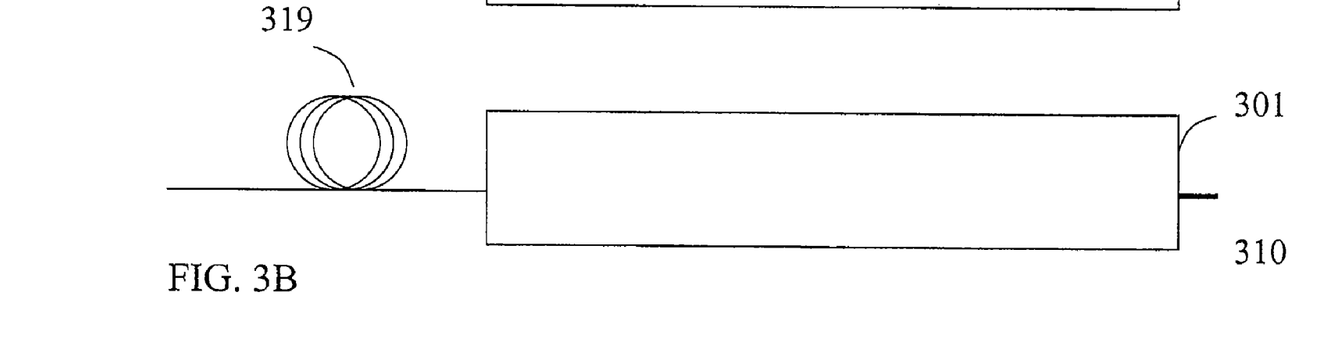
FIG. 3B is a simplified cross-sectional view diagram of the package hybrid integrated DWDM receiver of FIG. 3A.

FIG. 3A is a simplified top view diagram of a packaged hybrid integrated DWDM receiver according to an alternative embodiment of the present invention. FIG. 3B is a simplified cross-sectional view diagram of the package hybrid integrated DWDM receiver of FIG. 3A. These diagrams are merely examples, which should not unduly limit the scope of the claims herein. One of ordinary skill in the art would recognize other variations, modifications, and alternatives. As shown in FIG. 3A, packaged DWDM receiver 300 includes a functional block 101 inside a package 301. In an embodiment, functional block 101 includes the photodetector chips, the AWG, the submount, and the TEC, etc., for performing receiving functions similar to block 101 discussed above in connection with FIG. 1A. In an embodiment, packaged DWDM receiver 300 may include electrical post amplifiers 303 for boosting the electrical signal levels of the photodetectors. As shown, packaged DWDM receiver 300 also includes output terminals 310 for outputting converted electrical signals. In an embodiment, output terminals 310 are coupled to photodetectors in functional block 101 via electrical connections 305. In alternative embodiments, output terminals 310 may be coupled to post amplifiers, such as 303. In an embodiment, the receiver has a single optical input, typically through an optical fiber pigtail 319 for receiving the multiple-channel DWDM signals. In a specific embodiment, the receiver also has multiple electrical input and output connections that control and monitor the temperature of the AWG, the DC biases on the photodetectors, and output the received electrical signals for each channel.

Figure 4:
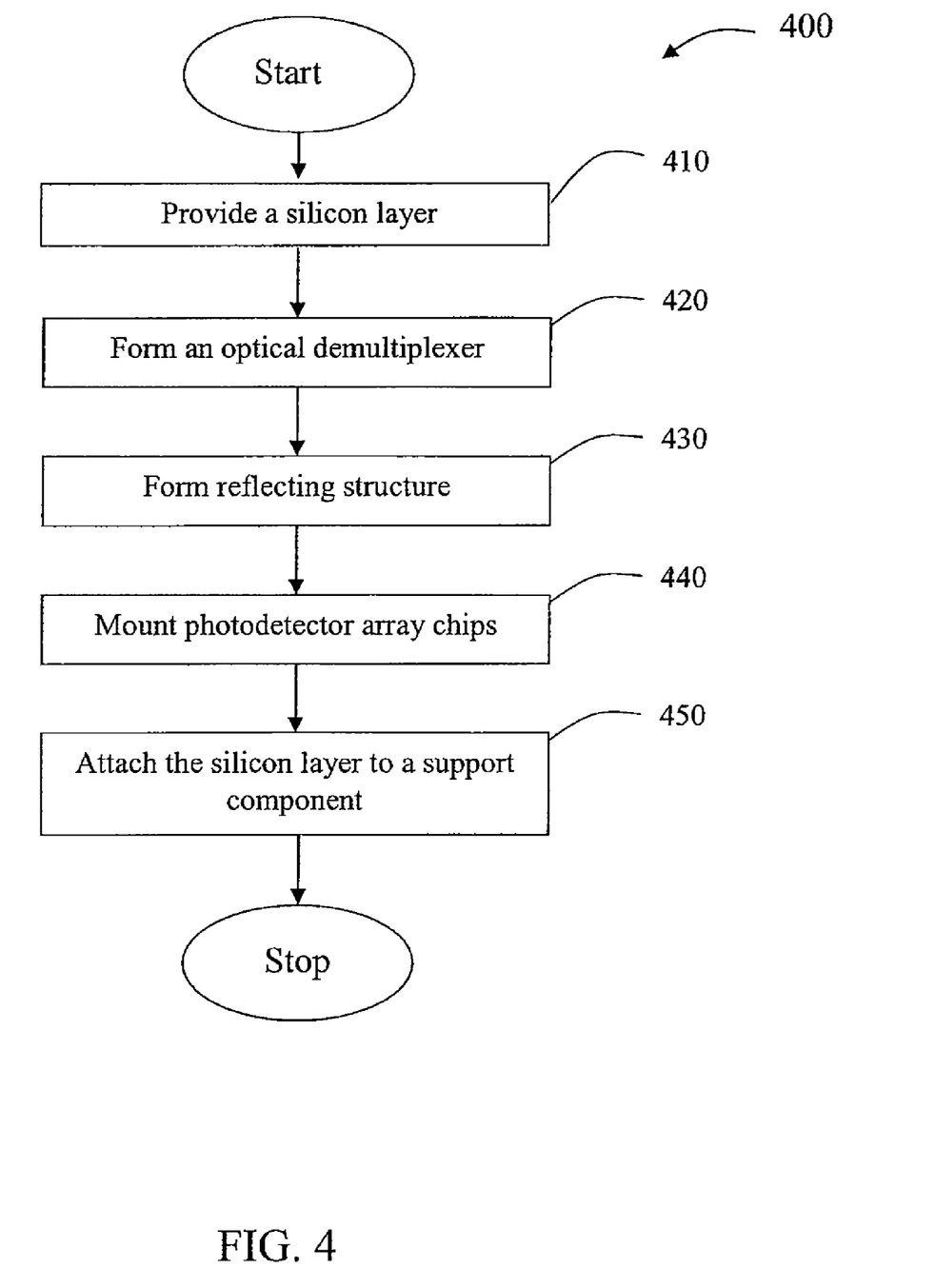
FIG. 4 is a simplified flowchart of a method for making in an integrated DWDM receiver according to an embodiment of the present invention.

FIG. 4 is a simplified flowchart of a method for making an integrated DWDM receiver according to an embodiment of the invention. This diagram is merely an example, which should not unduly limit the scope of the claims herein. One of ordinary skill in the art would recognize other variations, modifications, and alternatives. The method can be briefly outlined below.

1. (Process 410) Provide a silicon layer;
2. (Process 420) Form an optical demultiplexer in a silica layer over the silicon layer;
3. (Process 430) Form reflecting structures in the silica layer
4. (Process 440) Mount photodetector array chips; and
5. (Process 450) Attach the silicon layer to a support component.

As shown, FIG. 4 provides a method for making an integrated DWDM receiver apparatus. The method includes (Process 410) providing a silicon layer and (Process 420) forming an optical demultiplexer within a silica layer located on the silicon layer. In an embodiment, the optical demultiplexer includes a plurality of output waveguides and at least an input waveguide. In a specific embodiment, the optical demultiplexer includes an array waveguide grating. In a specific embodiment, the demultiplexer is formed using the following processes:

forming a first un-doped silica sub-layer on the silicon layer;

forming a doped silica sub-layer on the first un-doped silica sub-layer;

etching at least a second portion of the doped silica sub-layer; and depositing a second un-doped silica sub-layer on the etched doped silica sub-layer and the first un-doped silica sub-layer.

In Process 430, the method includes forming one or more reflecting structures in the silica layer. Each of the reflecting structures is optically coupled to a corresponding one of the plurality of output waveguides. In a specific embodiment, the reflecting structure is formed by first forming a recess region in the first region of the silica layer. The recess includes a first surface that terminates a corresponding one of the output waveguides. The recess region also includes a second surface spaced apart from the output waveguide and disposed at a 45° angle with respect to the output waveguide. In an example, light signals emitted by a horizontal output waveguide is reflected by 45° and directed up toward a photodetector, which is mounted above the reflecting surface as described below. To improve the reflectivity of the mirror, a metal coating, such as aluminum, can be formed on the reflecting surface. In another embodiment, the reflecting structure can be formed by making a cut to a waveguide to form a 45° surface to terminate the waveguide. The 45° surface enables total internal reflection of light signals arriving at the surface.

In Process 440, the method also includes mounting one or more semiconductor photodetector array chips on the silica layer. In a specific embodiment, each of the photodetector array chips includes one or more InP photodetector diodes, for example, a p-i-n diode or an avalanche photodiodes (APD). The mounting can be performed, for example, using a surface mount method. In a specific embodiment, a metal solder is used. Each photodetector overlies a reflecting structure and is optically coupled to the reflecting structure. With proper alignment, each photodetector is receives light signal from a corresponding output waveguide of the demultiplexer reflected off the reflecting structure. Finally, the method includes (Process 450) attaching the silica-on-silicon substrate to a support component. In an embodiment, the support component also includes a temperature adjustment component.

The above sequence of processes provides a method for making an integrated DWDM receiver apparatus according to an embodiment of the invention. As shown, the method uses a combination of processes including a way of making an optical demultiplexer in a silica-on-silicon substrate, mounting photodetector array chips on a portion of the substrate, and forming reflecting structures in the substrate to optically couple the demultiplexer and the photodetectors. Other alternatives can also be provided in which steps are added, one or more steps are removed, or one or more steps are provided in a different sequence without departing from the scope of the claims herein. Further details of the present method can be found throughout the present specification.

Many benefits are achieved by way of the present invention over conventional techniques. For example, in certain embodiments, an embodiment of the invention provides a method and system for integrating semiconductor InP photodetector chips with a silica/silicon AWG substrate for reducing the size and cost of the terminals of optical transport systems. Because the processing cost per unit area for silica-on-silicon can be two orders of magnitude lower than that for InP, the AWG according to embodiments of the present invention can be made at much lower cost. Silica-on-silicon AWGs is a much more mature technology. For example, transmission loss is much smaller in AWGs made of silica-on-silicon than those made of InP. Because there are much fewer elements on the InP chip according to embodiments of the invention, compared to the conventional InP monolithic integration method, the InP chip fabrication yield is much higher. Without AWG, the InP chip is also much smaller, according to an embodiment of the invention. The high yield and the small size significantly reduce the cost of the InP chips used for hybrid integration in accordance to embodiments of the present invention.

According to some embodiments of the present invention, a method is provided for using surface illuminated APDs which can results in >=10 dB increase in receiving sensitivity than conventional techniques. This improvement can enable long distance transmission without optical amplifiers. Further, in term of finished device, the size of a hybrid integrated DWDM receiver according to specific embodiments of the invention is comparable to that of a monolithically integrated DWDM receiver. Thus the small size advantage of an integrated DWDM receiver is retained according to certain embodiments of the present invention.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. An integrated dense wavelength division multiplexing (DWDM) receiver apparatus that converts a multiple-channel DWDM signal to multiple electrical signals, the apparatus comprising:

a support component;

a silica-on-silicon substrate overlying the support component, the silica-on-silicon substrate including a silica layer overlying a silicon layer, the silica-on-silicon substrate including a first surface region and a second surface region;

an optical demultiplexer within the silica layer, the optical demultiplexer being located under the first surface region and overlying the silicon layer, the optical demultiplexer including at least an input waveguide for receiving the multiple-channel DWDM signal and a plurality of output waveguides for outputting one or more optical signals;

one or more reflecting structures located in the silica layer underlying the second surface region, each of the one or more reflecting structures including in a recess in the silica layer, the recess having a silica surface configured as a reflecting surface, each of the one or more reflecting structures being optically coupled to a corresponding one of the plurality of output waveguides;

one or more semiconductor photodetector array chips overlying the second surface region of the silica-on-silicon substrate, each of the one or more photodetector array chips including one or more photodetectors for converting an optical signal into a corresponding electrical signal, each of the one or more photodetectors overlying and being optically coupled to a corresponding one of the reflecting structures; and one or more output terminals to output the converted electrical signals by the photodetectors.

2. The apparatus of claim 1 wherein the optical demultiplexer comprises an arrayed waveguide grating.

3. The apparatus of claim 1 wherein each of the one or more semiconductor photodetector array chips is mounted on the silica-on-silicon substrate using a surface mount method.

4. The apparatus of claim 1 wherein each of the one or more semiconductor photodetector array chips includes one or more InP photodetector diodes.

5. The apparatus of claim 1 wherein the optical demultiplexer includes a doped silica waveguide in an intrinsic silica layer.

6. The apparatus of claim 1 wherein each of the one or more semiconductor photodetector array chips includes one or more p-i-n (PIN) photodiodes.

7. The apparatus of claim 1 wherein each of the one or more semiconductor photodetector array chips includes one or more avalanche photodiodes (APD).

8. The apparatus of claim 1 wherein each of the one or more reflecting structures comprises a mirror structure.

9. The apparatus of claim 1 wherein the reflecting surface in each of the one or more reflecting structures is at approximately 45° angle with respect to a corresponding one of the plurality of output waveguides and with respect to a surface of a corresponding one of the photodetectors.

10. The apparatus of claim 1 wherein the reflecting surface of each of the one or more reflecting structures further comprises a metal layer.

11. The apparatus of claim 1 wherein each of the one or more reflecting structures comprises a recess region in the silica layer, a surface of the recess region terminating a corresponding one of the plurality of the output waveguides, the surface being at approximately 45° angle with respect to the waveguide.

12. The apparatus of claim 1 wherein the support component comprises a metal-containing or ceramic-containing material.

13. The apparatus of claim 1 wherein the support component comprises a temperature adjustment component, the temperature adjustment component including a thermal electric cooler (TEC) or an electric heater.

14. An integrated dense wavelength division multiplexing (DWDM) receiver apparatus, the apparatus comprising:
   a support component;
   a silica-on-silicon substrate overlying the support component, the silica-on-silicon substrate including a silica layer and a silicon layer, the silica-on-silicon substrate including a first surface region and a second surface region;
   an arrayed waveguide grating within the silica layer, the arrayed waveguide grating being located under the first surface region and overlying the silicon layer, the arrayed waveguide grating including a plurality of output waveguides and at least an input waveguide;
   a plurality of reflecting structures located in the silica layer underlying the second surface region, each of the one or more reflecting structures being optically coupled to a corresponding one of the plurality of output waveguides; and
   one or more InP photodetector array chips overlying the second surface region of the silica-on-silicon substrate, each of the one or more photodetector array chips including a plurality of InP photodetectors, each of the plurality of InP photodetectors being optically coupled to a corresponding one of the one or more reflecting structures.

15. A method for making an integrated DWDM receiver apparatus, the method comprising:
   providing a silicon layer;
   forming an optical demultiplexer within a silica layer, the silica layer being located on the silicon layer, the optical demultiplexer including a plurality of output waveguides and at least an input waveguide;
   forming one or more reflecting structures in the silica layer, each of the one or more reflecting structures having a reflecting silica surface and being optically coupled to a corresponding one of the plurality of output waveguides;
   mounting one or more semiconductor photodetector array chips on the silica layer, each of the one or more semiconductor photodetector array chips including one or more photodetectors, each of the one or more photodetectors overlying a corresponding one of the one or more reflecting structures;
   attaching the silicon layer to a support component;
   wherein the forming the optical demultiplexer includes:
      forming a first un-doped silica sub-layer on the silicon layer;
      forming a doped silica sub-layer on the first un-doped silica sub-layer;
      etching at least a second portion of the doped silica sub-layer; depositing a second un-doped silica sub-layer on the etched doped silica sub-layer and the first un-doped silica sub-layer.

16. The method of claim 15 wherein each of the one or more semiconductor photodetector array chips includes one or more photodetector diodes made in InP.

17. The method of claim 15 wherein the optical demultiplexer comprises an arrayed waveguide grating.

18. The method of claim 15 wherein the forming of one or more reflecting structures comprises:
   forming a recess region in a first region of the silica layer, the recess region including a first silica surface and a second silica surface, the first silica surface terminating a corresponding one of the output waveguides, the second silica surface being spaced apart from the output waveguide and being disposed at approximately 45° angle with respect to the output waveguide; and
   coating the second surface using a metal layer.

19. The method of claim 15 wherein the forming of one or more reflecting structures comprises making approximately 45° cut to one or more of the output waveguides to form a terminating surface of the waveguide for enabling total internal reflection.

20. The method of claim 15 wherein the mounting of one or more semiconductor photodetector array chips is performed using a surface mount method.

21. The method of claim 15 wherein the mounting of one or more semiconductor photodetector array chips is performed using metal solder in a surface mount process.

22. The method of claim 15 wherein the support component comprises a temperature adjustment component, the temperature adjustment component including a thermal electric cooler (TEC) or an electric heater.

* * * * *